(12) United States Patent
Tang et al.

(10) Patent No.: US 10,706,114 B2
(45) Date of Patent: Jul. 7, 2020

(54) SYSTEMS AND METHODS FOR USING LINK GRAPHS TO DEMOTE LINKS TO LOW-QUALITY WEBPAGES

(71) Applicant: Facebook, Inc., Menlo Park, CA (US)

(72) Inventors: Sijian Tang, Menlo Park, CA (US); Jiayi Wen, Sunnyvale, CA (US); James Li, Pleasanton, CA (US); Shengbo Guo, San Jose, CA (US); Chenzhang He, New York, NY (US); Jiun-Ren Lin, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 291 days.

(21) Appl. No.: 15/816,121

(22) Filed: Nov. 17, 2017

(65) Prior Publication Data

US 2019/0155952 A1    May 23, 2019

(51) Int. Cl.
| | |
|---|---|
| G06F 16/9535 | (2019.01) |
| G06F 16/248 | (2019.01) |
| G06F 16/958 | (2019.01) |
| G06F 16/901 | (2019.01) |
| G06F 16/2457 | (2019.01) |
| G06F 16/955 | (2019.01) |
| G06N 20/00 | (2019.01) |
| G06N 7/00 | (2006.01) |

(52) U.S. Cl.
CPC ........ *G06F 16/9535* (2019.01); *G06F 16/248* (2019.01); *G06F 16/24578* (2019.01); *G06F 16/9024* (2019.01); *G06F 16/958* (2019.01); *G06F 16/9566* (2019.01); *G06N 20/00* (2019.01); *G06N 7/005* (2013.01)

(58) Field of Classification Search
CPC ............... G06F 16/951; G06F 16/9535; G06F 16/24578; G06F 16/2228; G06F 16/9024; G06F 16/2246; G06F 16/248; G06F 16/335
USPC .......................... 707/709, 732, 749, 748, 798
See application file for complete search history.

(56) References Cited

U.S. PATENT DOCUMENTS

| | | | | |
|---|---|---|---|---|
| 8,438,189 | B2 * | 5/2013 | Andersen | G06F 16/951 707/800 |
| 8,589,391 | B1 * | 11/2013 | Reynar | G06F 16/9535 707/732 |
| 8,694,374 | B1 * | 4/2014 | Diligenti | G06Q 30/02 705/14.47 |
| 2010/0268701 | A1 * | 10/2010 | Zhang | G06F 16/95 707/709 |

(Continued)

Primary Examiner — Dangelino N Gortayo
(74) Attorney, Agent, or Firm — FisherBroyles, LLP

(57) ABSTRACT

The disclosed computer-implemented method may include (1) sampling links from an online system, (2) receiving, from a human labeler for each of the links, a label indicating whether the human labeler considers a landing page of the link to be a low-quality webpage, (3) generating a link graph from a crawl of the links, (4) using the link graph to derive a graph-based feature for each of the links, (5) using the label and the graph-based feature of each of the links to train a model configured to predict a likelihood that a link is to a low-quality webpage, (6) identifying content items that are candidates for a content feed of a user, (7) applying the model to the content items to determine a ranking, and (8) displaying the content items in the content feed based on the ranking. Various other methods, systems, and computer-readable media are also disclosed.

20 Claims, 12 Drawing Sheets

(56) References Cited

U.S. PATENT DOCUMENTS

| | | | |
|---|---|---|---|
| 2012/0143792 A1* | 6/2012 | Wang | G06F 16/954 706/12 |
| 2013/0073568 A1* | 3/2013 | Federov | G06Q 50/01 707/749 |
| 2014/0122584 A1* | 5/2014 | Gargi | G06Q 50/01 709/204 |
| 2014/0280121 A1* | 9/2014 | Sharp | G06F 16/24578 707/732 |
| 2015/0199357 A1* | 7/2015 | Hwang | G06F 16/954 707/748 |

* cited by examiner

SYSTEMS AND METHODS FOR USING LINK GRAPHS TO DEMOTE LINKS TO LOW-QUALITY WEBPAGES

BACKGROUND

Many online systems, such as social networking systems and other social media systems, allow users to connect to and communicate with other users. Users may create profiles on an online system that are tied to their identities and that include information about the users, such as interests and demographic information. An online system may allow a user to easily communicate and to share content with other users by allowing the user to post content on the online system for presentation to the other users. Content posted on the online system by the user (i.e., user-provided content) may be declarative information provided by the user, status updates, images, photographs, videos, text data, any other information the user wishes to share with other users of the online system such as links to news stories or other external webpages, or a combination thereof. User-provided content may also include sponsored content that a sponsoring user (e.g., an advertiser) requests to be presented to other users of the online system who are not necessarily connected with the sponsoring user.

To ensure that users have a high-quality experience, many online systems maintain content policies that prohibit or control user-provided content with links to misleading, disruptive, sensational, spammy, objectionable, offensive, suggestive, violent, illegal, unintelligible, malicious, and/or other types of low-quality webpages. Unfortunately, less scrupulous users of these online systems, especially those with financial incentives, often ignore such content policies and continue to post content to the online systems that contains links to low-quality webpages. For example, on some online systems, purveyors of ad-farm webpages (e.g., webpages that contain mostly advertisements and little quality content) are often the source of content posts or advertisements that contain links to low-quality webpages. The instant disclosure, therefore, identifies and addresses a need for systems and methods that detect and manage user-provided content that contains links to ad-farm webpages and other types of low-quality webpages.

SUMMARY

As will be described in greater detail below, the instant disclosure describes various systems and methods for using link graphs to demote links to low-quality webpages on online systems. In one example, a method for using link graphs to demote links to low-quality webpages may include (1) sampling user-provided links from an online system, (2) receiving, from at least one human labeler for each of the user-provided links, at least one label indicating whether the human labeler considers a landing page of the user-provided link to be a low-quality webpage, (3) generating a link graph from a crawl of the user-provided links, (4) using the link graph to derive at least one graph-based feature for each of the user-provided links, (5) using the label and the graph-based feature of each of the user-provided links to train a model configured to predict a likelihood that a user-provided link is to a low-quality webpage, (6) identifying user-provided content items that are candidates for a content feed of a user of the online system, (7) applying the model to a link of each of the user-provided content items to determine a ranking of the user-provided content items, and (8) displaying the user-provided content items in the content feed of the user based at least in part on the ranking. In some examples, the landing page of each of the sampled user-provided links may be represented in the link graph by a vertex.

In some examples, the step of using the link graph to derive the graph-based feature for each of the user-provided links may include applying a pagerank algorithm to the link graph to derive a pagerank metric for each vertex in the link graph, and the graph-based feature of each of the user-provided links may be the pagerank metric of the vertex in the link graph representing the landing page of the user-provided link. In some examples, the step of using the link graph to derive the graph-based feature for each of the user-provided links may include applying a truncated-pagerank algorithm to the link graph to derive a truncated-pagerank metric for each vertex in the link graph, and the graph-based feature of each of the user-provided links may be the truncated-pagerank metric of the vertex in the link graph representing the landing page of the user-provided link.

In some examples, the step of using the link graph to derive the graph-based feature for each of the user-provided links may include (1) designating, as a trusted vertex, each vertex in the link graph representing a landing page having a label indicating that the human labeler does not consider the landing page to be a low-quality webpage and (2) applying a trustrank algorithm to the link graph to derive a trustrank metric for each vertex in the link graph; and the graph-based feature of each of the user-provided links may be the trustrank metric of the vertex in the link graph representing the user-provided link. In at least one example, the step of using the link graph to derive the graph-based feature for each of the user-provided links may include (1) identifying an additional model configured to predict a likelihood that a webpage will be assigned a label indicating that the human labeler does not consider the landing page to be a low-quality webpage, (2) using the additional model to predict, for each webpage represented in the link graph, a likelihood that the webpage would be assigned the label by the human labeler, (3) designating, as a trusted vertex, each vertex in the link graph representing a webpage whose likelihood of being assigned the label by the human labeler is greater than a predetermined threshold, and (4) applying a trustrank algorithm to the link graph to derive a trustrank metric for each vertex in the link graph; and the graph-based feature of each of the user-provided links may be the trustrank metric of the vertex in the link graph representing the user-provided link.

In some examples, the step of using the link graph to derive the graph-based feature for each of the user-provided links may include (1) designating, as an untrusted vertex, each vertex in the link graph representing a landing page having a label indicating that the human labeler considers the landing page to be a low-quality webpage and (2) applying an anti-trust-rank algorithm to the link graph to derive an anti-trust-rank metric for each vertex in the link graph; and the graph-based feature of each of the user-provided links may be the anti-trust-rank metric of the vertex in the link graph representing the user-provided link. In at least one example, the step of using the link graph to derive the graph-based feature for each of the user-provided links may include (1) identifying an additional model configured to predict a likelihood that a webpage will be assigned a label indicating that the human labeler considers the landing page to be a low-quality webpage, (2) using the additional model to predict, for each webpage represented in the link graph, a likelihood that the webpage would be assigned the label by the human labeler, (3) designating, as an untrusted vertex, each vertex in the link graph representing a webpage whose likelihood of being assigned the label by the human labeler is greater than a predetermined threshold, and (4) applying an anti-trust-rank algorithm to the link graph to derive an anti-trust-rank metric for each vertex in the link graph; and the graph-based feature of each of the user-provided links may be the anti-trust-rank metric of the vertex in the link graph representing the user-provided link.

In some examples, the step of applying the model to determine the ranking of the user-provided content items may include (1) using an additional model to determine an initial ranking for each of the user-provided content items, (2) using the model to predict, for a link of at least one of the user-provided content items, a relatively higher likelihood of being a link to a low-quality webpage, and (3) demoting the initial ranking of the at least one of the user-provided content items based on the relatively higher likelihood. In some examples, the method may further include (1) identifying an additional user-provided content item that is a candidate for the content feed of the user, (2) using the model to determine a likelihood that a link of the additional user-provided content item is to a low-quality webpage, (3) determining that the likelihood is above a predetermined threshold, and (4) refraining from displaying the additional user-provided content feed item in the content feed of the user based on the likelihood being above the predetermined threshold.

In some examples, the label of each of the user-provided links may indicate whether the human labeler considers the landing page of the user-provided link to have less than a threshold level of high-quality content, a disproportionate volume of advertisements relative to high-quality content, sexually-suggestive content, shocking content, malicious content, deceptive content, a pop-up advertisement, and/or an interstitial advertisement.

In addition, a corresponding system for using link graphs to demote links to low-quality webpages may include several modules stored in memory, including (1) a sampling module that samples user-provided links from an online system, (2) a receiving module that receives, from at least one human labeler for each of the user-provided links, at least one label indicating whether the human labeler considers a landing page of the user-provided link to be a low-quality webpage, (3) a generating module that generates a link graph from a crawl of the user-provided links, (4) a deriving module that uses the link graph to derive at least one graph-based feature for each of the user-provided links, (5) a training module that uses the label and the graph-based features of each of the user-provided links to train a model configured to predict a likelihood that a user-provided link is to a low-quality webpage, (6) an identifying module that identifies user-provided content items that are candidates for a content feed of a user of the online system, (7) an applying module that applies the model to a link of each of the user-provided content items to determine a ranking of the user-provided content items, and (8) a displaying module that displays the user-provided content items in the content feed of the user based at least in part on the ranking. The system may also include at least one physical processor configured to execute the sampling module, the receiving module, the generating module, the deriving module, the training module, the identifying module, the applying module, and the displaying module.

In some examples, the deriving module may use the link graph to derive the graph-based feature for each of the user-provided links by applying a pagerank algorithm to the link graph to derive a pagerank metric for each vertex in the link graph, and the graph-based feature of each of the user-provided links may be the pagerank metric of the vertex in the link graph representing the landing page of the user-provided link. In some examples, the deriving module may use the link graph to derive the graph-based feature for each of the user-provided links by applying a truncated-pagerank algorithm to the link graph to derive a truncated-pagerank metric for each vertex in the link graph, and the graph-based feature of each of the user-provided links may be the truncated-pagerank metric of the vertex in the link graph representing the landing page of the user-provided link.

In some examples, the deriving module may use the link graph to derive the graph-based feature for each of the user-provided links by (1) designating, as a trusted vertex, each vertex in the link graph representing a landing page having a label indicating that the human labeler does not consider the landing page to be a low-quality webpage and (2) applying a trustrank algorithm to the link graph to derive a trustrank metric for each vertex in the link graph; and the graph-based feature of each of the user-provided links may be the trustrank metric of the vertex in the link graph representing the user-provided link. In some examples, the deriving module may use the link graph to derive the graph-based feature for each of the user-provided links by (1) identifying an additional model configured to predict a likelihood that a webpage will be assigned a label indicating that the human labeler does not consider the landing page to be a low-quality webpage, (2) using the additional model to predict, for each webpage represented in the link graph, a likelihood that the webpage would be assigned the label by the human labeler, (3) designating, as a trusted vertex, each vertex in the link graph representing a webpage whose likelihood of being assigned the label by the human labeler is greater than a predetermined threshold, and (4) applying a trustrank algorithm to the link graph to derive a trustrank metric for each vertex in the link graph; and the graph-based feature of each of the user-provided links may be the trustrank metric of the vertex in the link graph representing the user-provided link.

In some examples, the deriving module may use the link graph to derive the graph-based feature for each of the user-provided links by (1) designating, as an untrusted vertex, each vertex in the link graph representing a landing page having a label indicating that the human labeler considers the landing page to be a low-quality webpage and (2) applying an anti-trust-rank algorithm to the link graph to derive an anti-trust-rank metric for each vertex in the link graph; and the graph-based feature of each of the user-provided links may be the anti-trust-rank metric of the vertex in the link graph representing the user-provided link. In some examples, the deriving module may use the link graph to derive the graph-based feature for each of the user-provided links by (1) identifying an additional model configured to predict a likelihood that a webpage will be assigned a label indicating that the human labeler considers the landing page to be a low-quality webpage, (2) using the additional model to predict, for each webpage represented in the link graph, a likelihood that the webpage would be assigned the label by the human labeler, (3) designating, as an untrusted vertex, each vertex in the link graph representing a webpage whose likelihood of being assigned the label by the human labeler is greater than a predetermined threshold, and (4) applying an anti-trust-rank algorithm to the link graph to derive an anti-trust-rank metric for each vertex in the link graph; and the graph-based feature of each of the user-provided links may be the anti-trust-rank metric of the vertex in the link graph representing the user-provided link.

In some examples, the above-described method may be encoded as computer-readable instructions on a computer-readable medium. For example, a computer-readable medium may include one or more computer-executable instructions that, when executed by at least one processor of a computing device, may cause the computing device to (1) sample user-provided links from an online system, (2) receive, from at least one human labeler for each of the user-provided links, at least one label indicating whether the human labeler considers a landing page of the user-provided link to be a low-quality webpage, (3) generate a link graph from a crawl of the user-provided links, (4) use the link graph to derive at least one graph-based feature for each of the user-provided links, (5) use the label and the graph-based feature of each of the user-provided links to train a model configured to predict a likelihood that a user-provided link is to a low-quality webpage, (6) identify user-provided content items that are candidates for a content feed of a user of the online system, (7) apply the model to a link of each of the user-provided content items to determine a ranking of the user-provided content items, and (8) display the user-provided content items in the content feed of the user based at least in part on the ranking.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
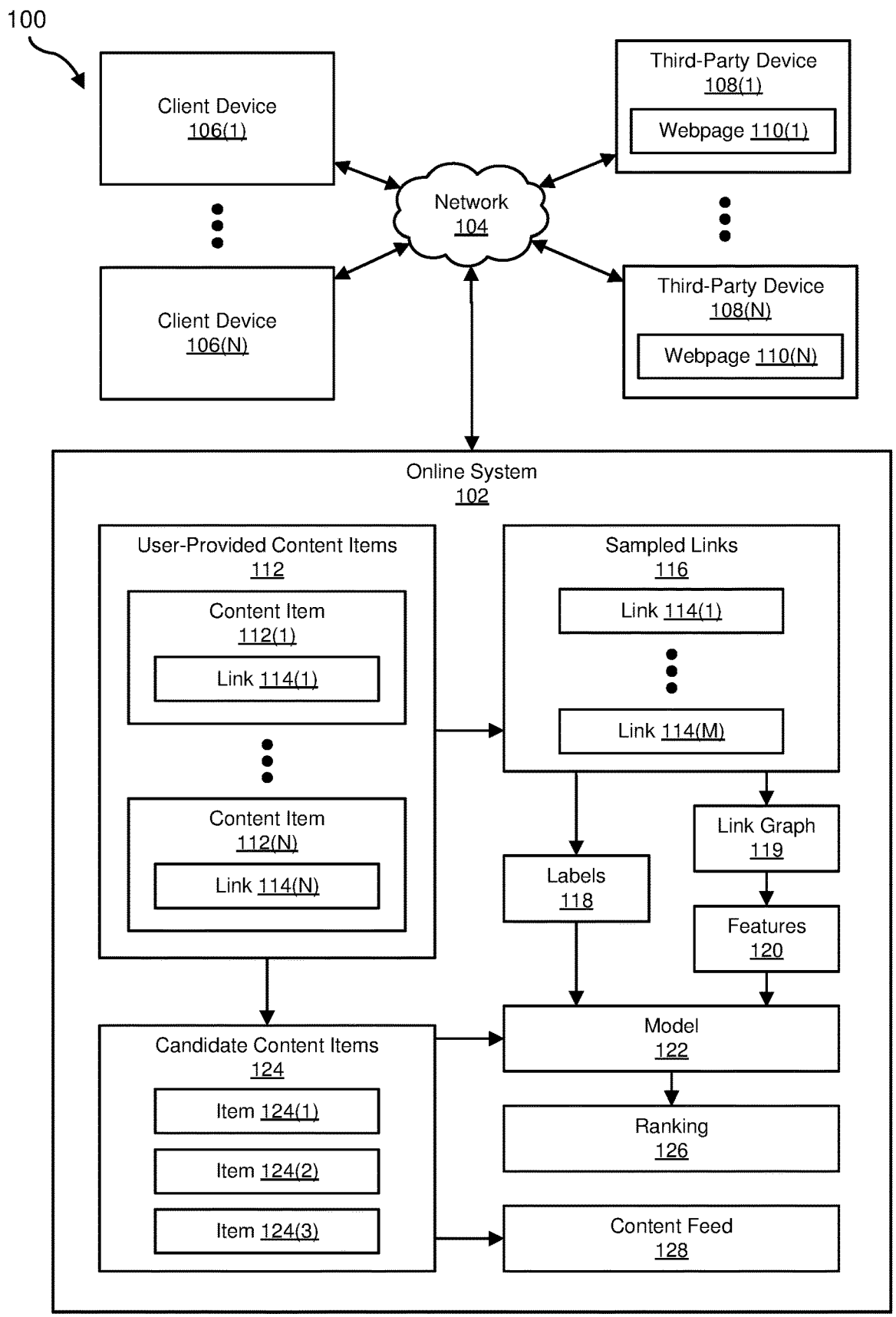
FIG. 1 is a block diagram of an exemplary system environment in which an exemplary online system operates.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting links to low-quality webpages (e.g., ad-farm webpages). As will be explained in greater detail below, the systems described herein may (1) build a link graph using information about known low-quality webpages (e.g., known ad-farm webpages) and their inbound and outbound links and then (2) train a prediction model using various features derived from the link graph. In some examples, a suitable pagerank, trustrank, anti-trust-rank, or truncated pagerank algorithm may be applied to the link graph to generate the features used to train the prediction model. By using the prediction model to detect when user-provided content on an online system contains links that are likely to low-quality webpages, the systems and methods disclosed herein may display the user-provided content less prominently on the online system or not at all. By displaying the user-provided content less prominently or not at all, the systems and methods disclosed herein may display, more prominently or more often, other user-provided content that contain links that are likely to higher-quality webpages and thereby improve the viewing experiences of the users of the online system. Embodiments of the instant disclosure may also provide various other advantages and features, as discussed in greater detail below.

Figure 12:
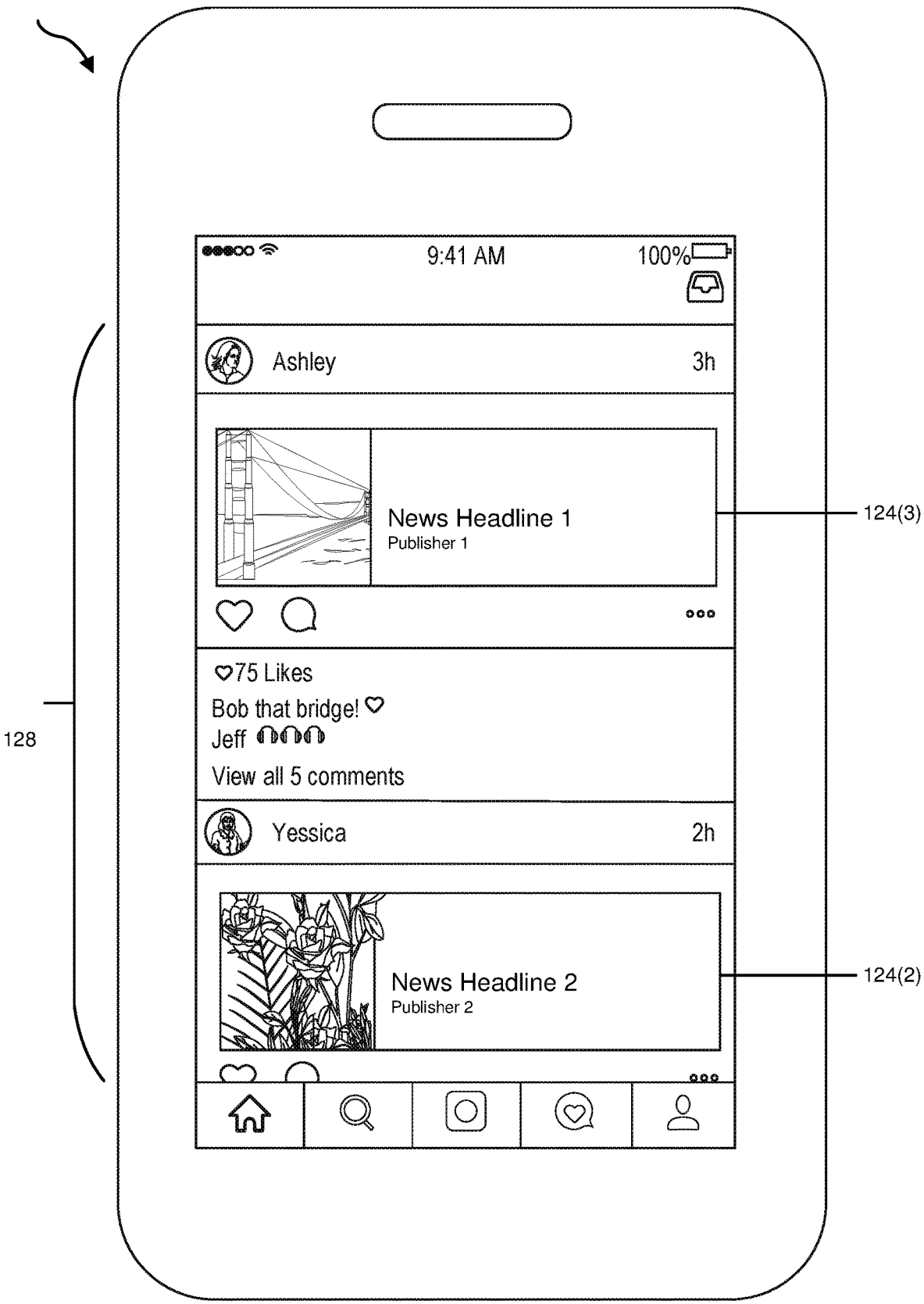
FIG. 12 is an illustration of an exemplary mobile device displaying exemplary user-provided content items in an exemplary digital content feed.

The following will provide, with reference to FIG. 1, detailed descriptions of an example system for detecting links to low-quality webpages (e.g., ad-farm webpages). Detailed descriptions of a computer-implemented method and corresponding data flows will also be provided in connection with FIGS. 2, 3, and 9-11. Detailed descriptions of example link graphs and methods for using these link graphs to derive graph-based features will be provided in connection with FIGS. 4-8. Also, detailed descriptions of demoting user-provided news-feed items when displaying a digital news feed on a mobile device will be provided in connection with FIG. 12.

FIG. 1 is a block diagram of an exemplary system environment 100 in which an online system 102 operates. As illustrated in this figure, system environment 100 may include one or more client devices 106 and one or more third-party devices 108. In this example, client devices 106(1)-(N) generally represent computing devices of the users of online system 102 that are capable of receiving user input and posting content items to online system 102 via network 104 (e.g., the Internet). Third-party devices 108(1)-(N) generally represent computing devices or systems of one or more third-party entities that are configured to host webpages 110(1)-(N), respectively.

Online system 102 may generally represent any system that receives content items from or for its users via the Internet and stores and/or hosts these content items for its users. Examples of online system 102 include, without limitation, social-networking systems, social-media systems, photo-sharing systems, video-sharing systems, email systems, file-hosting systems, file-backup systems, news-aggregation systems, and messaging systems. As shown in FIG. 1, online system 102 may receive and/or store user-provided content items 112 from client devices 106. In some examples, each of user-provided content items 112 may include a link to a webpage hosted by third-party devices 108. For example, content items 112(1)-(N) may contain links 114(1)-(N), respectively; and links 114(1)-(N) may reference or point to webpages 110(1)-(N), respectively.

Figure 2:
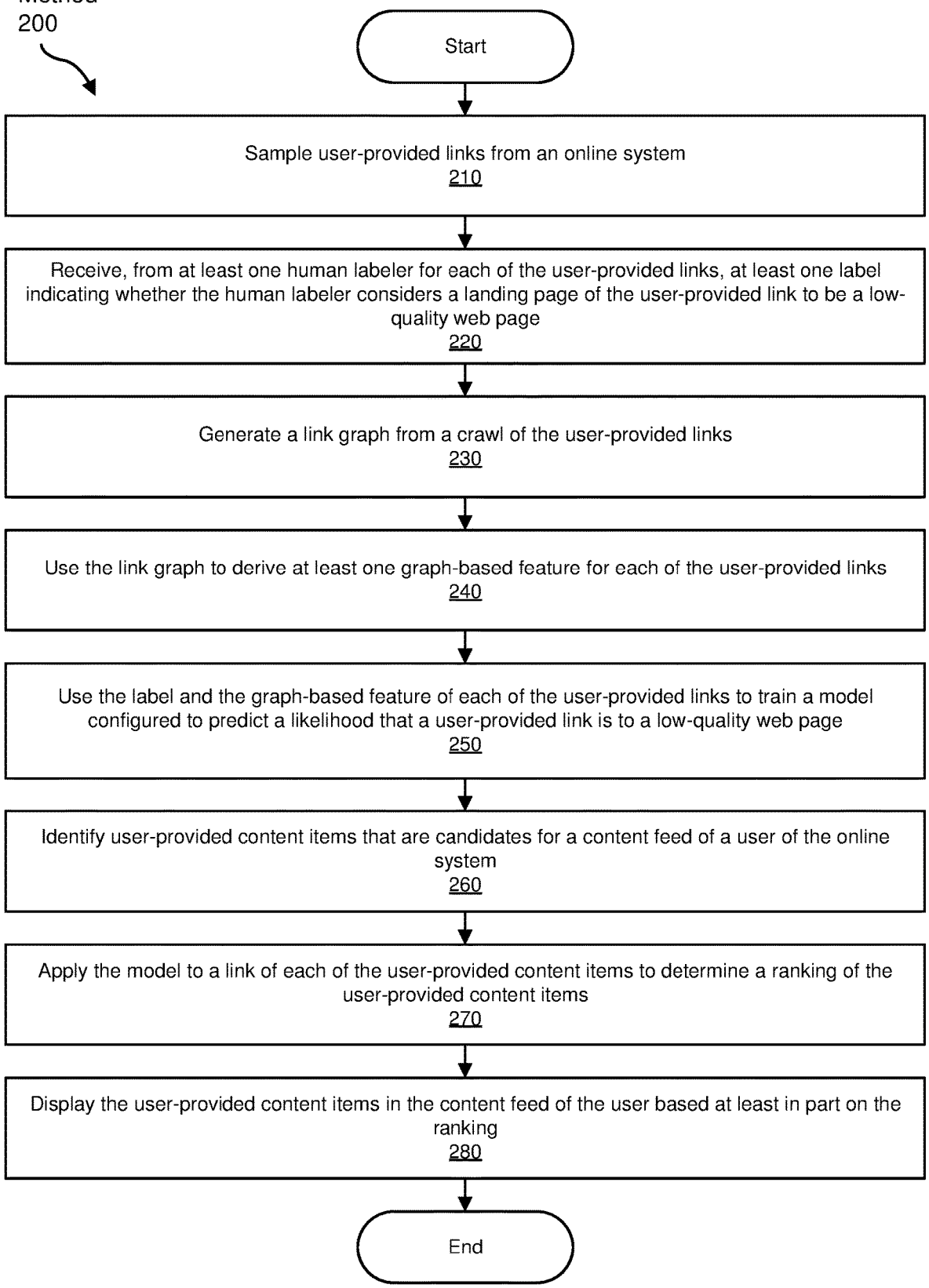
FIG. 2 is a flow diagram of an exemplary method for using link graphs to demote links to low-quality webpages.
Figure 3:
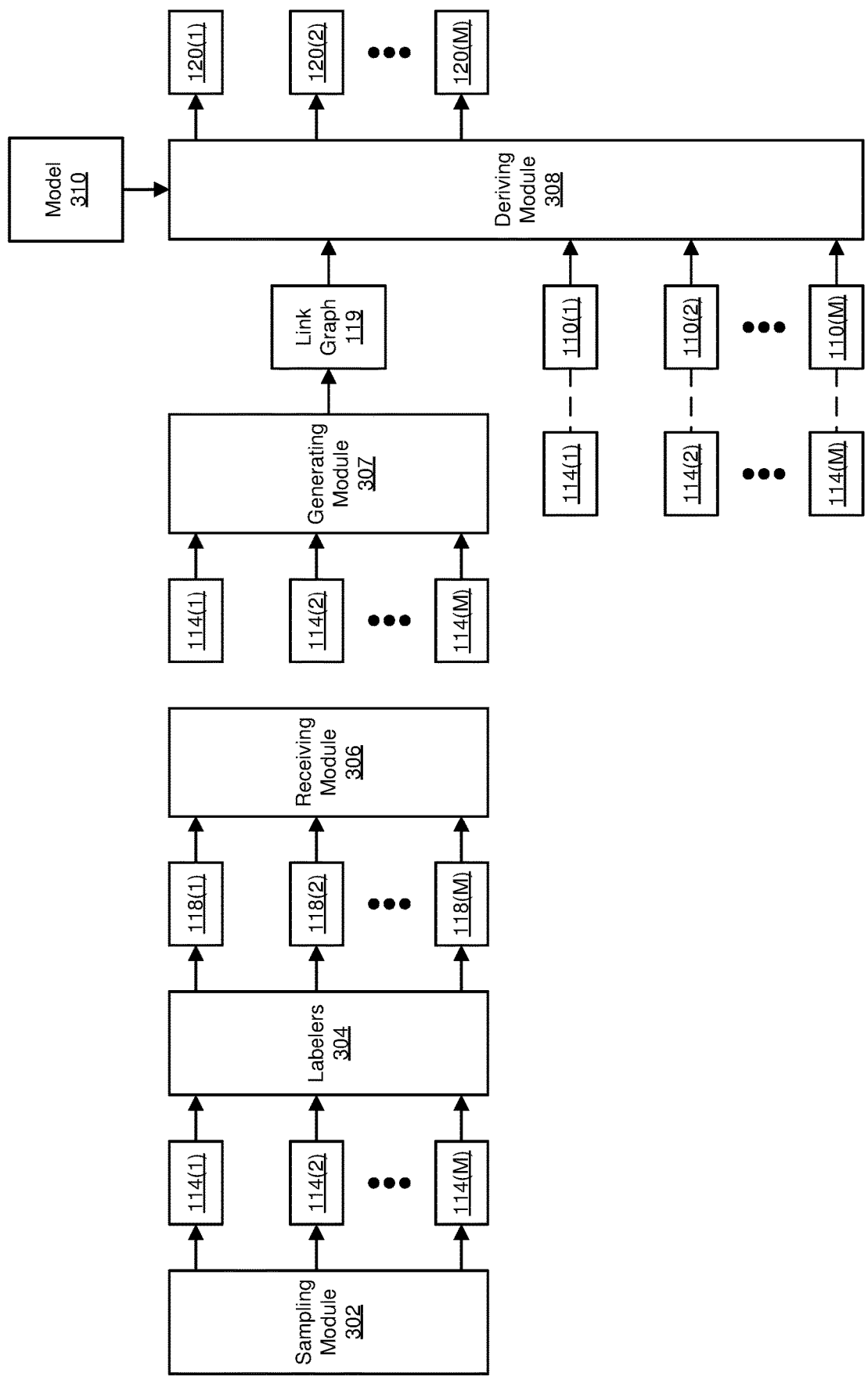
FIG. 3 is a flow diagram of an exemplary data flow for generating labels and graph-based features for user-provided links.
Figure 4:
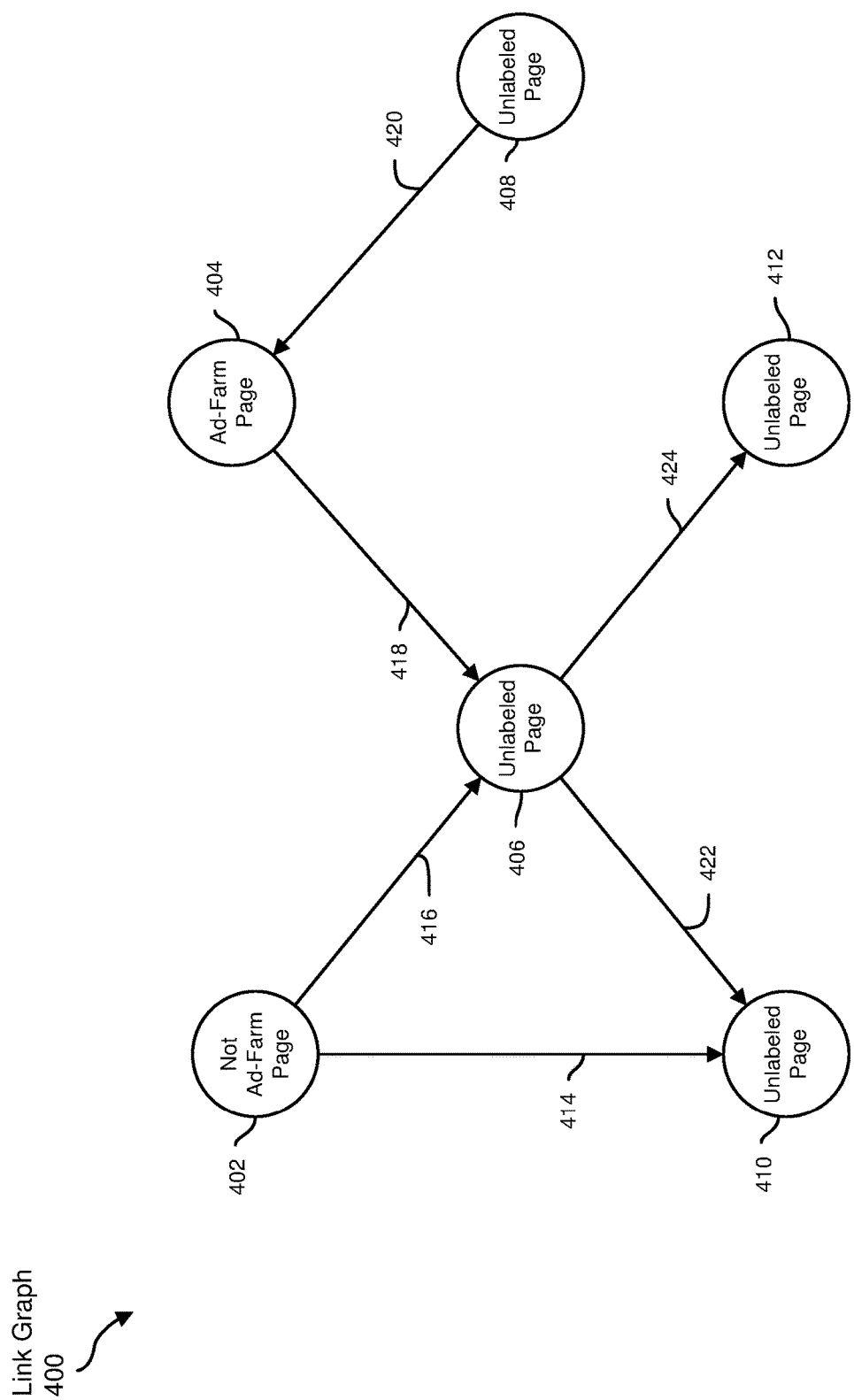
FIG. 4 is a block diagram of an exemplary link graph.
Figure 5:
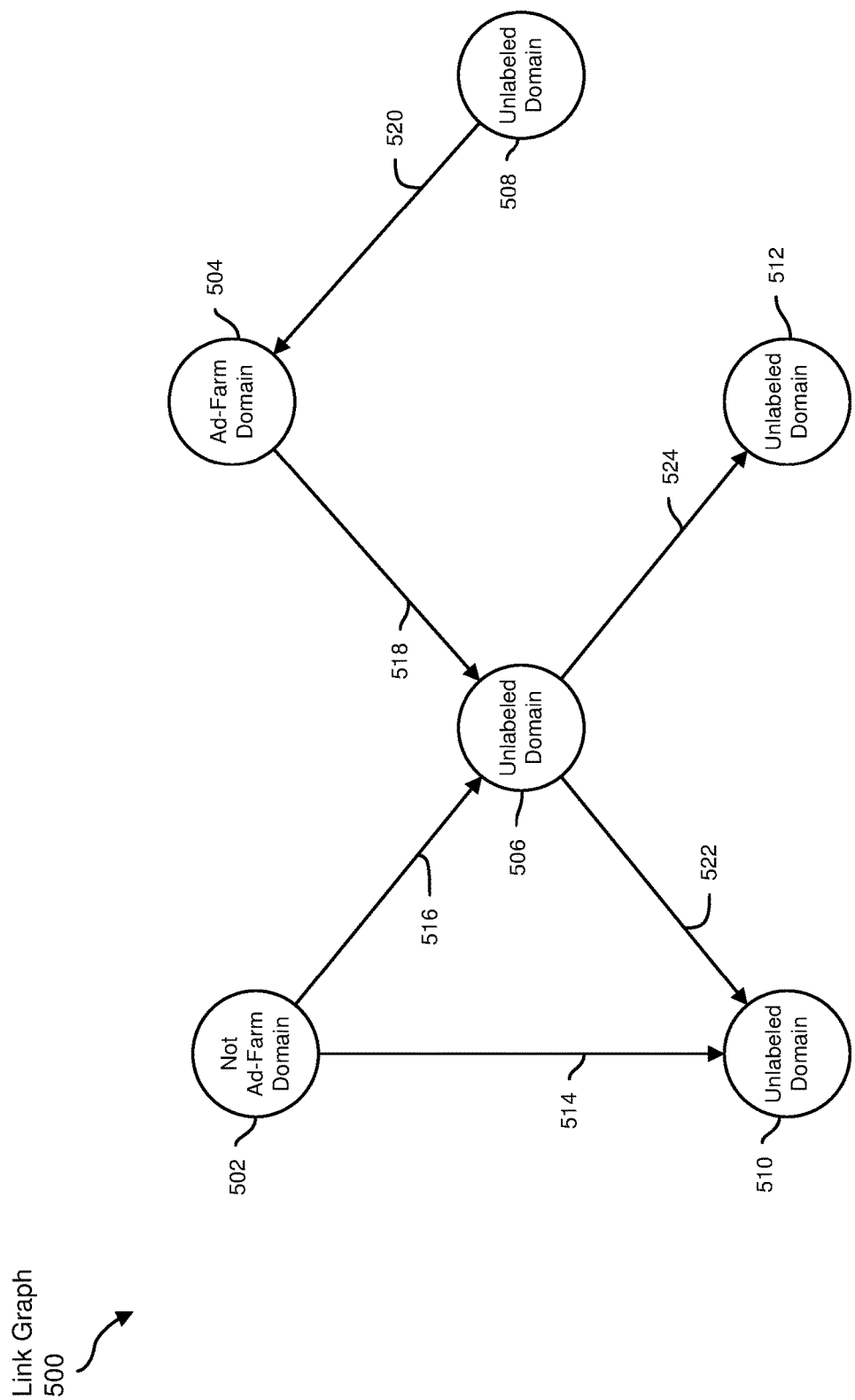
FIG. 5 is a block diagram of an exemplary domain-level link graph.

FIG. 2 is a flow diagram of an example computer-implemented method 200 for using link graphs to demote links to low-quality webpages. The steps shown in FIG. 2 may be performed by any suitable computer-executable code and/or computing system, including online system 102 in FIG. 1. In one example, each of the steps shown in FIG. 2 may represent an algorithm whose structure includes and/or is represented by multiple sub-steps, examples of which will be provided in greater detail below.

As illustrated in FIG. 2, at step 210, one or more of the systems described herein may sample user-provided links from an online system. Using FIGS. 1 and 3 as an example, sampling module 302 may, as part of online system 102 in FIG. 1, sample links 116 (e.g., user-provided links 114(1)-(M)) from user-provided content items 112(1)-(N).

The systems described herein may sample user-provided links (e.g., hyperlinks made up of Uniform Resource Locators (URLs)) in any suitable manner and from any suitable source of user-provided links. In one example, the systems described herein may randomly sample user-provided links from the content items that are received at, stored on, or made available through an online system. In some examples, the systems described herein may sample a higher number of user-provided links from content items that are more likely to contain links to low-quality webpages. Upon sampling user-provided links, the systems described herein may send the user-provided links to one or more human labelers for labeling. Using FIG. 3 as an example, sampling module 302 may, as part of online system 102 in FIG. 1, send user-provided links 114(1)-(M) to labelers 304 for labeling.

In some embodiments, the term "user-provided content item" generally means any single instance of content posted to an online system by a user that may be shown to other users of the online system. In some examples, a user-provided content item may be organic social-media content (e.g., a post, a story, etc.) or any advertisement that is intended to be displayed on a social-media system with or alongside such social-media content. In some examples, a user of an online system may post a user-provided content item to a content feed of the user (e.g., a timeline), and other users of the online system may view the user-provided content item by viewing the content feed of the user. In other examples, a user of an online system may post a user-provided content item to a content feed of a group of users of the online system, and each member of the group may view the user-provided content item by viewing the content feed of the group of users.

In some examples, an online system may compile a content feed for each user of the online system. An online system may display a variety of user-provided content items to the user via the content feed. For example, a user may follow, be friends with, or be connected to other users of the online system, and the online system may compile a content feed for the user that includes content items posted by these other users. In other examples, the user may have indicated the user's interests to the online system, and the online system may compile a content feed for the user that includes content items that may be related to the user's interests. In other examples, the user may have provided information about the user to the online system (e.g., demographic information, interests, etc.), and the online system may compile a content feed for the user that includes content items posted by other users (e.g., an advertiser) that wish to target or communicate with the user.

In some examples, some or all of the user-provided content items that are received by an online system may include links to webpages or other content that are external to the online system and not under the control of the online system. When a user clicks on a link contained within a user-provided content item, the user may be redirected from the online system to an external webpage (i.e., the landing page of the link).

At step 220, one or more of the systems described herein may receive, from at least one human labeler for each of the user-provided links, at least one label indicating whether the human labeler considers a landing page of the user-provided link to be a low-quality webpage. Using FIG. 3 as an example, receiving module 306 may, as part of online system 102 in FIG. 1, receive labels 118(1)-(M) for user-provided links 114(1)-(M), respectively.

In some embodiments, the term "label" generally means any classification that is assigned to or associated with a user-provided link and used to distinguish some user-provided links from other user-provided links. In some examples, a human labeler may assign one or more pre-defined labels to a user-provided link by examining the landing page referenced by the user-provided link and determining which of the predefined labels describe the landing page. In some examples, a label may indicate that the landing page is a high-quality webpage or likely not a low-quality webpage by indicating a human labeler's opinion that the landing page has suitable content, that the landing page has high-quality content, and/or that the landing page is not a low-quality webpage. Alternatively, a label may indicate that a landing page is likely a low-quality webpage by indicating a human labeler's opinion that the landing page has less than a threshold level of high-quality content (e.g., less than 10 lines of text), that the landing page has a disproportionate volume of advertisements relative to content (e.g., more than 50% advertisements), that the landing page has sexually-suggestive content, that the landing page has shocking content, that the landing page has disruptive content, that the landing page has malicious content, that the landing page has deceptive content, that the landing page has a pop-up advertisement, and/or that the landing page has an interstitial advertisement.

In some examples, the systems described herein may automatically assign additional labels to a user-provided link based on the labels that have been assigned by human labelers to the user-provided link. For example, the systems described herein may assign a label to a user-provided link that indicates that its landing page is a "strong ad farm" if the landing page has been assigned two or more labels that are indicative of ad-farm webpages (e.g., two or more of the labels described above that may indicate that a landing page is likely a low-quality webpage). Additionally or alternatively, the systems and methods may assign a label to a user-provided link that indicates its landing page is a "weak ad farm" if the landing page has been assigned one label that is indicative of ad-farm webpages.

At step 230, one or more of the systems described herein may generate a link graph from a crawl of the user-provided links. Using FIG. 3 as an example, generating module 307 may generate link graph 119 by crawling user-provided links 114(1)-(M). In some embodiments, the term "link graph"

generally means any logical, topological, and/or graphical representation of one or more webpages, websites, or domains and the links between them. Examples of link graphs may include link graph 400 in FIG. 4 and link graph 500 in FIG. 5.

In some examples, the systems and methods described herein may construct one or more link graphs that use vertices, nodes, or points to represent webpages and edges (e.g., directed edges) to represent any links between the webpages. Using FIG. 4 as an example, link graph 400 may include vertices 402-412 interconnected by directed edges 414-424. In this example, vertex 402 may represent a webpage whose labels indicate that it is not or is likely not an ad-farm webpage, vertex 404 may represent a webpage whose labels indicate that it is or likely is an ad-farm webpage, and vertices 406-412 may represent unlabeled webpages. In this example, directed edges 414 and 416 may represent outbound links contained on the webpage represented by vertex 402 to the webpages represented by vertex 410 and 406, respectively. Similarly, directed edge 418 may represent an outbound link contained on the webpage represented by vertex 404 to the webpage represented by vertex 406, and directed edge 420 may represent an outbound link contained on the webpage represented by vertex 408 to the webpage represented by vertex 404. Likewise, directed edges 422 and 424 may represent outbound links contained on the webpage represented by vertex 406 to the webpages represented by vertex 410 and 412, respectively.

In some examples, the systems and methods described herein may construct one or more domain-level link graphs that use vertices, nodes, or points to represent websites or domains and edges (e.g., directed edges) to represent any links between the websites or domains. Using FIG. 5 as an example, link graph 500 may include vertices 502-512 interconnected by directed edges 514-524. In this example, vertex 502 may represent a domain of webpages whose labels indicate that they are not or are likely not ad-farm webpages, vertex 504 may represent a domain of webpages whose labels indicate that they are or likely are ad-farm webpages, and vertices 506-512 may represent domains of unlabeled webpages. In this example, directed edges 514 and 516 may represent outbound links contained on webpages in the domain represented by vertex 502 to webpages in the domains represented by vertex 510 and 506, respectively. Similarly, directed edge 518 may represent outbound links contained on webpages in the domain represented by vertex 504 to webpages in the domain represented by vertex 506, and directed edge 520 may represent outbound links contained on webpages in the domain represented by vertex 508 to webpages in the domain represented by vertex 504. Likewise, directed edges 522 and 524 may represent outbound links contained on webpages in the domain represented by vertex 506 to webpages in the domains represented by vertex 510 and 512, respectively.

The systems described herein may construct a link graph in any suitable manner. In one example, the systems described herein may use a web crawler or spider to crawl the World Wide Web with user-provided links 114(1)-(M) being used as seed links. As the web crawler visits the webpages that are referenced by user-provided links (1)-(M) (i.e., webpages 110(1)-(M)), the web crawler may identify all the hyperlinks in the webpages and add them to a list of links to visit. The web crawler may then recursively visit all of the links in the list of links in a similar manner. In some examples, the web crawler may stop visiting new links after a predetermined crawl-depth has been reached. The systems described herein may represent each webpage, website, or domain that was encountered by the web crawler as a vertex in a link graph and each link traversed by the web crawler as a directed edge in the link graph.

At step 240, one or more of the systems described herein may use the link graph to derive at least one graph-based feature for each of the user-provided links. Using FIG. 3 as an example, deriving module 308 may, as part of online system 102 in FIG. 1, derive features 120(1)-(M) for user-provided links 114(1)-(M), respectively.

The systems described herein may derive graph-based features from the link graphs constructed at step 230 using any suitable graph-based algorithm. In one example, the systems described herein may apply a suitable pagerank algorithm, a suitable truncated-pagerank algorithm, a suitable trustrank algorithm, and/or a suitable anti-trust-rank algorithm to the link graphs constructed at step 230 to calculate graph-based scores for each vertex in the link graphs. Upon applying a suitable graph-based algorithm to a link graph, the systems described herein may assign the resulting graph-based scores of the vertices in the link graphs to the user-provided links represented by the vertices.

Figure 6:
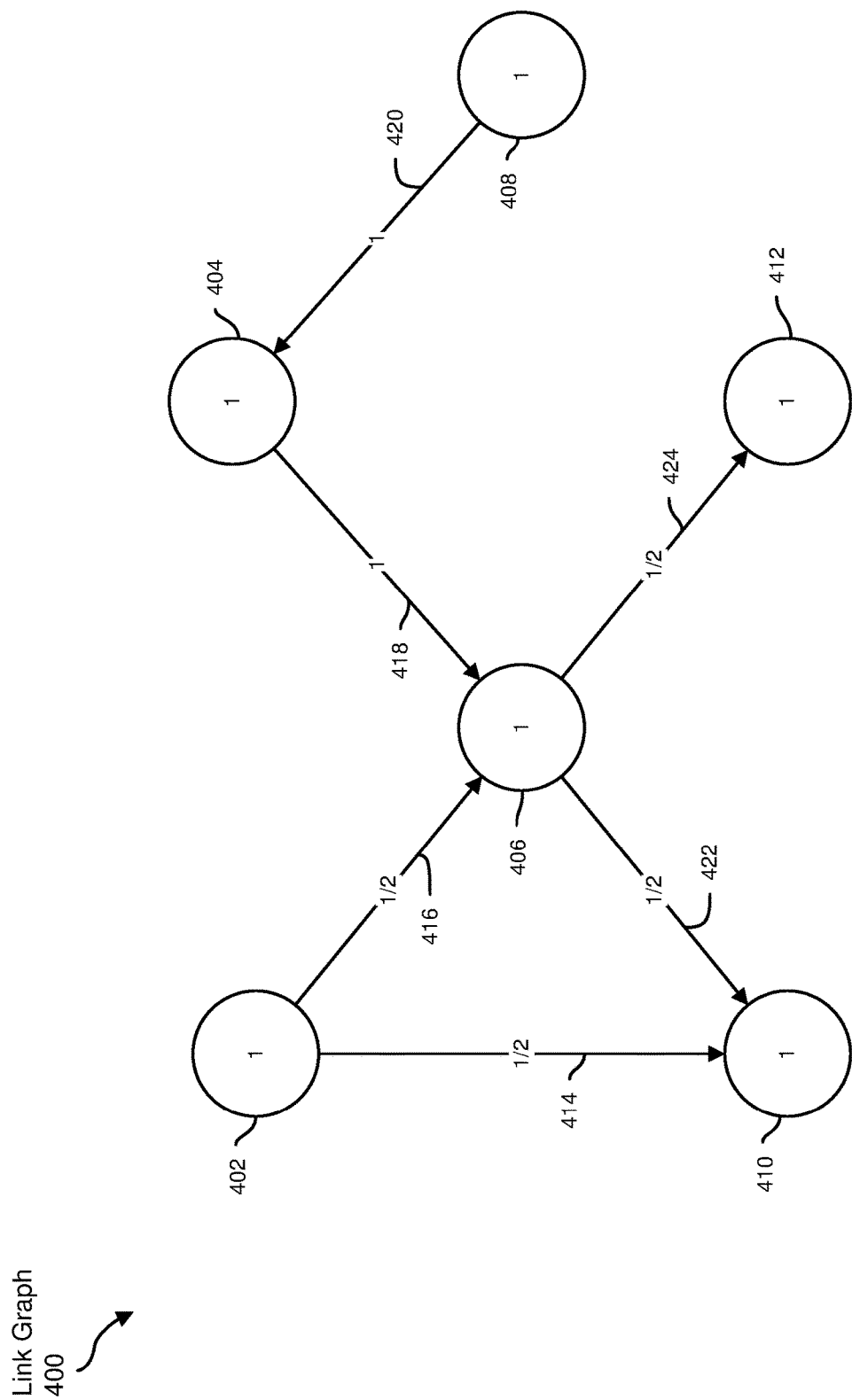
FIG. 6 is a flow diagram of an exemplary first iteration of an exemplary pagerank algorithm.
Figure 7:
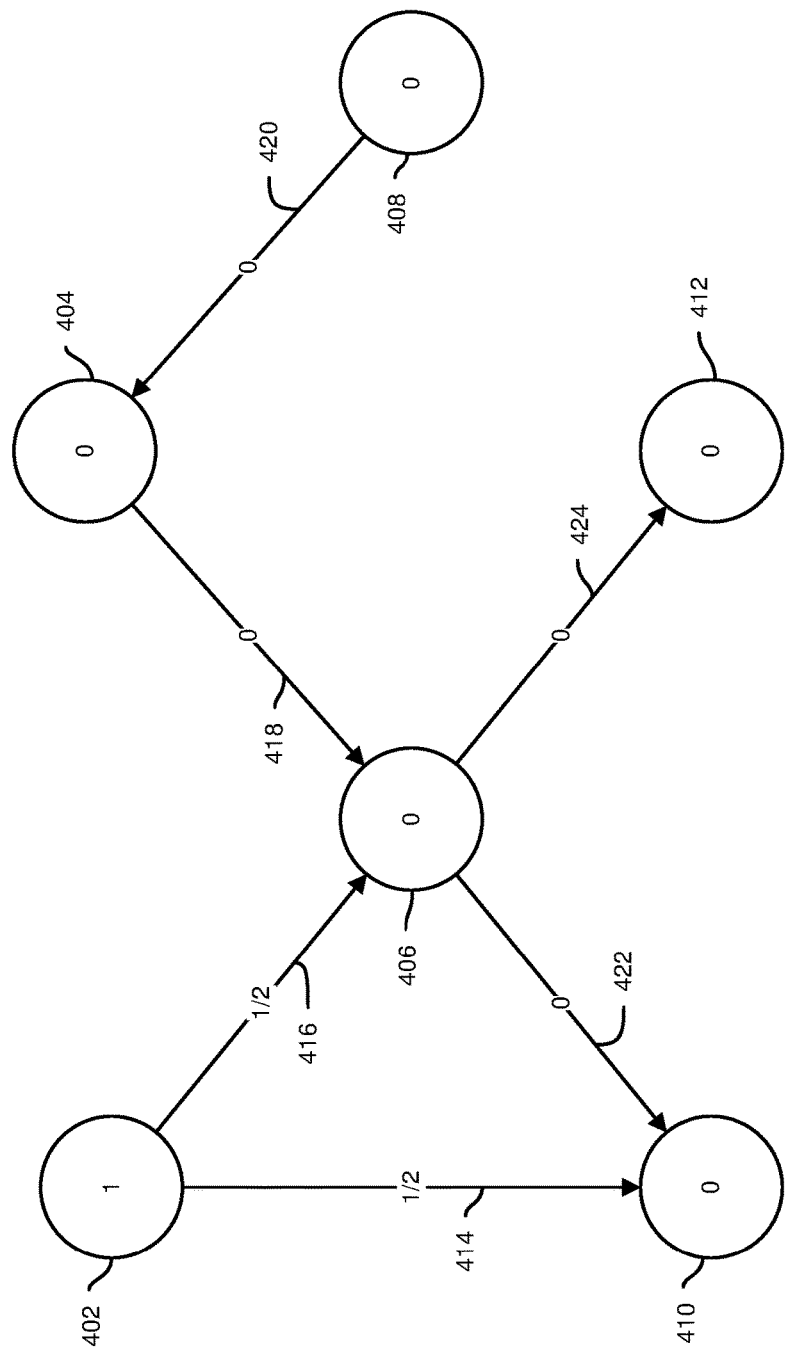
FIG. 7 is a flow diagram of an exemplary first iteration of an exemplary trustrank algorithm.
Figure 8:
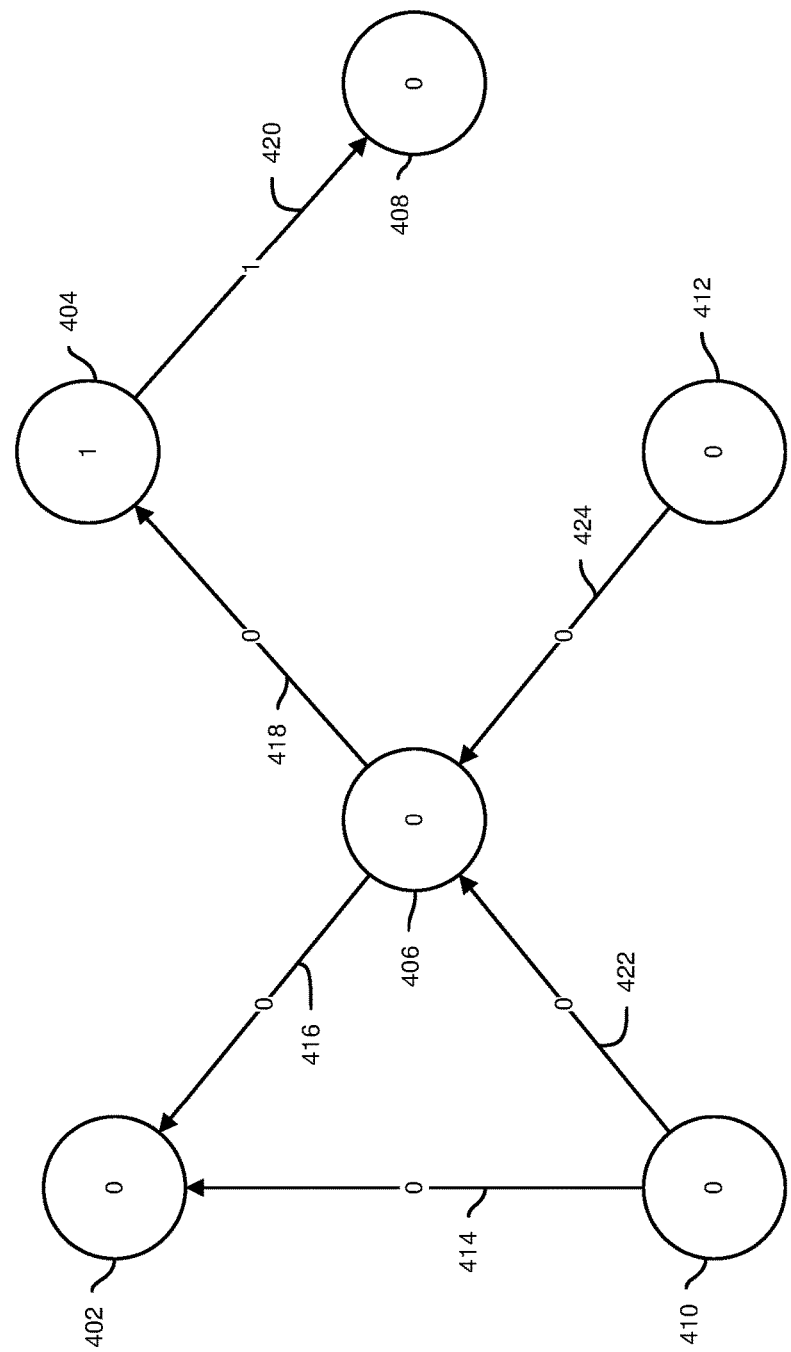
FIG. 8 is a flow diagram of an exemplary first iteration of an exemplary anti-trust-rank algorithm.
Figure 9:
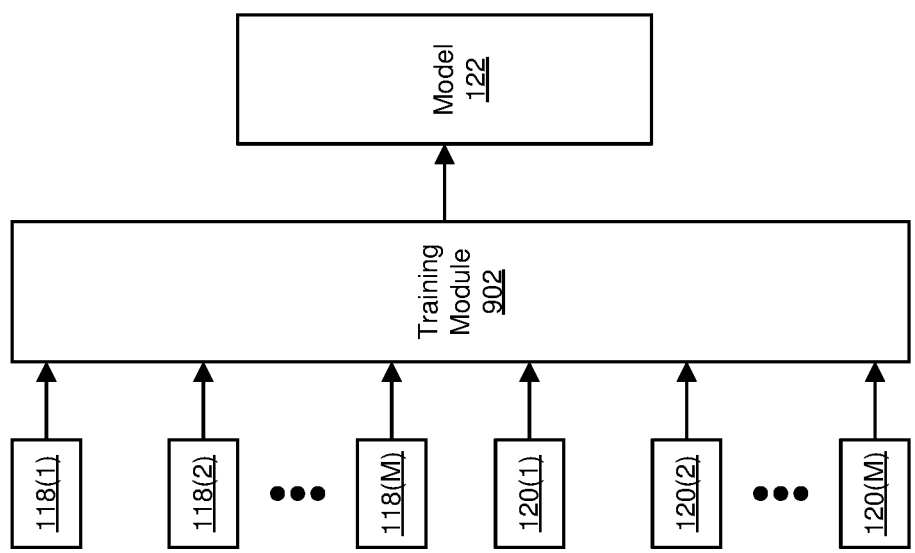
FIG. 9 is a flow diagram of an exemplary data flow for training a model to predict a likelihood that a user-provided link is to a low-quality webpage.
Figure 10:
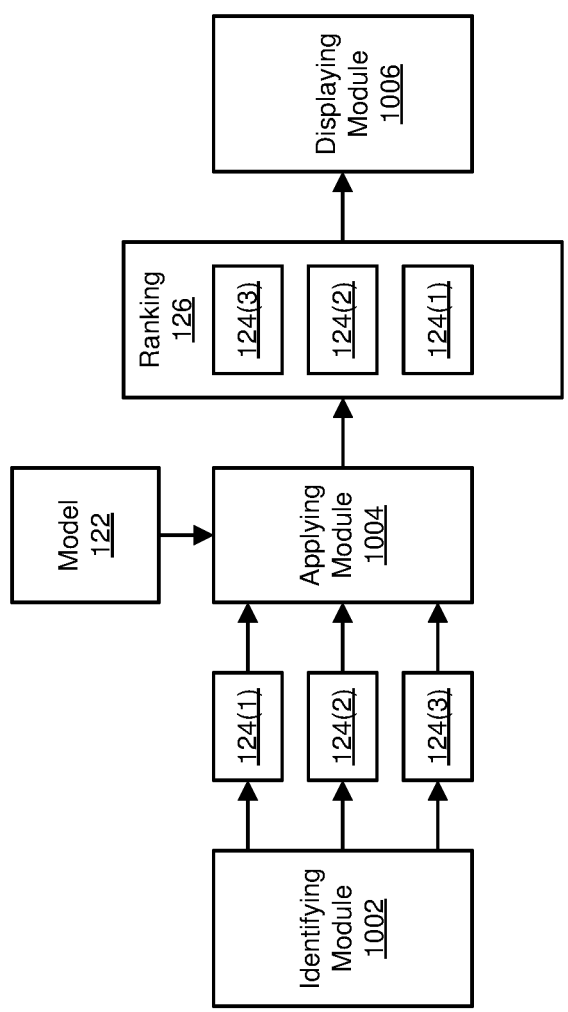
FIG. 10 is a flow diagram of an exemplary data flow for ranking and displaying user-provided content items.
Figure 11:
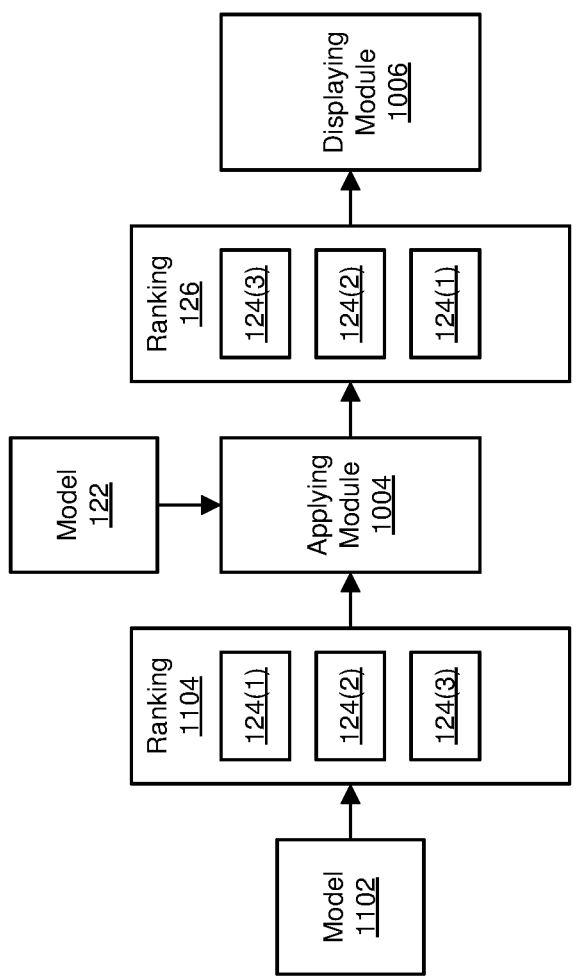
FIG. 11 is a flow diagram of an additional exemplary data flow for ranking and displaying user-provided content items.

In some embodiments, the term "pagerank algorithm" generally means a graph-based algorithm that scores the importance of the webpages, websites, or domains represented in a link graph based on the number and/or quality of the webpages', websites', or domains' inbound links. In some instances, a relatively higher pagerank score may indicate that a webpage or domain has a relatively higher importance and/or a relatively lower likelihood of being a low-quality webpage or domain. Conversely, a relatively lower pagerank score may indicate that a webpage or domain has a relatively lower importance and/or a relatively higher likelihood of being a low-quality webpage or domain. FIG. 6 illustrates a first iteration of a pagerank algorithm on link graph 400. In this example, each vertex has been given an initial value of 1 for its pagerank score, and the pagerank score of each vertex is being transferred to the targets of its outbound links after being divided equally among them. In some embodiments, the term "truncated-pagerank algorithm" generally means a pagerank algorithm that scores the importance of the webpages, websites, or domains represented in a link graph based on various degree-based measures.

In some embodiments, the term "trustrank algorithm" generally means a graph-based algorithm that scores the trustworthiness of the webpages, websites, or domains represented in a link graph based on a seed of trusted webpages, websites, or domains whose initial trust scores are propagated along the links in the link graph. Before applying a trustrank algorithm to a link graph, the systems described herein may designate, as a trusted vertex, each vertex in the link graph representing a webpage having a label indicating that a human labeler does not consider the webpage to be a low-quality webpage. Using FIG. 7 as an example, before applying a trustrank algorithm to link graph 400, the systems described herein may designate vertex 402 as a trusted vertex based on the webpage represented by vertex 402 having a label indicating that a human labeler does not consider the webpage to be an ad-farm webpage. In this example, the trustrank score of vertex 402 is transferred to the targets of its outbound links after being divided equally among them. In some examples, the systems described herein may designate other vertices in a link graph as trusted vertices by (1) identifying an additional model configured to predict a likelihood that a webpage will be assigned a label indicating that a human labeler does not consider the webpage to be a low-quality webpage, (2) using the additional model to predict, for each webpage represented in the link graph, a likelihood that the webpage would be assigned the label by a human labeler, and (3) designating, as a trusted vertex, each vertex in the link graph representing a webpage whose likelihood of being assigned the label by a human labeler is greater than a predetermined threshold.

In some examples, the term "anti-trust-rank algorithm" generally means a graph-based algorithm that scores the lack of trustworthiness of the webpages, websites, or domains represented in a link graph based on a seed of untrusted vertices whose anti-trust scores are propagated in a reverse direction along the links in the link graph. Before applying an anti-trust-rank algorithm to a link graph, the systems described herein may designate, as an untrusted vertex, each vertex in the link graph representing a webpage having a label indicating that a human labeler considers the webpage to be a low-quality webpage. Using FIG. 8 as an example, before applying an anti-trust-rank algorithm to link graph 400, the systems described herein may designate vertex 404 as an untrusted vertex based on the webpage represented by vertex 404 having a label indicating that a human labeler considers the webpage to be an ad-farm webpage. In this example, the anti-trust-rank score of vertex 404 is being transferred to the source of its lone inbound link. In some examples, the systems described herein may designate other vertices in a link graph as untrusted vertices by (1) identifying an additional model configured to predict a likelihood that a webpage will be assigned a label indicating that a human labeler considers the webpage to be a low-quality webpage, (2) using the additional model to predict, for each webpage represented in the link graph, a likelihood that the webpage would be assigned the label by a human labeler, and (3) designating, as a untrusted vertex, each vertex in the link graph representing a webpage whose likelihood of being assigned the label by a human labeler is greater than a predetermined threshold.

In addition to graph-based features, the systems described herein may derive various other content-based features for each user-provided link contained in a link graph. In some examples, the systems described herein may download each webpage represented in the link graph and/or its components (e.g., images, scripts, styles, etc.) and extract features from the downloaded webpage and/or components. Examples of content-based features that may be extracted include, without limitation, the number of words on the webpage, the number of links within the webpage, the languages of the text contained within the webpage, the number of common words on the webpage, the length of various portions of the text contained within the webpage, the height of the webpage, the number of images or ads on the webpage, features of the layout of the webpage, features of the URL of the webpage (e.g., the domain of the webpage), and/or any other suitable features of the webpage. In some examples, the systems and methods described herein may train an additional model (e.g., model 310 in FIG. 3) to predict, based on text content of a webpage, a likelihood that the webpage would be assigned a particular label. In these examples, the systems described herein may scrape text content from the webpage of a user-provided link, use the additional model to predict a likelihood that the webpage would be assigned the label by the human labeler, and use the likelihood that the webpage would be assigned the label by the human labeler as one of the content-based features of the user-provided link.

At step 250, one or more of the systems described herein may use the label and the graph-based features of each of the user-provided links to train a model configured to predict a likelihood that a user-provided link is to a low-quality webpage. Using FIG. 9 as an example, training module 902 may, as part of online system 102 in FIG. 1, train model 122 using labels 118(1)-(M) and features 120(1)-(M). In some examples, the systems described herein may train the model to predict a likelihood that a user-provided link is to a low-quality webpage by training the model to predict a likelihood that a user-provided link is to a low-quality domain. In some embodiments, the term "model" generally means any machine-learning model, algorithm, heuristic, data, or combination thereof, that may be used to calculate a label or score that indicates a likelihood that a user-provided link is to a low-quality webpage. Examples of models include, without limitation, decision trees (e.g., boosting decision trees), neural networks (e.g., a deep convolutional neural network), deep-learning models, support vector machines, linear classifiers, non-linear classifiers, perceptrons, naive Bayes classifiers, any other machine-learning or classification techniques or algorithms, or any combination thereof. Once trained, a model may be capable of identify numerous types of low-quality webpages, such as webpages with a disproportionate volume of ads relative to content, webpages with sexually suggestive or shocking content, webpages with malicious or deceptive ads, and webpages that use pop-up ads or interstitial ads.

At step 260, one or more of the systems described herein may identify user-provided content items that are candidates for a content feed of a user of the online system. Using FIG. 10 as an example, identifying module 1002 may, as part of online system 102 in FIG. 1, identify content items 124(1)-(3) from user-provided content items 112 that are candidates for content feed 128 of a user of online system 102.

At step 270, one or more of the systems described herein may apply the model to a link of each of the user-provided content items to determine a ranking of the user-provided content items. Using FIG. 10 as an example, applying module 1004 may, as part of online system 102 in FIG. 1, generate ranking 126 by applying model 122 to links contained in content items 124(1)-(3). In this example, ranking 126 may indicate the order in which content items 124(1)-(3) should be displayed in content feed 128 (e.g., content item 124(3) first, content item 124(2) second, and content item 124(1) third).

The systems described herein may rank or order candidate user-provided content items in any suitable manner. In general, the systems described herein may (1) use the model trained at step 240 to determine the likelihood that each candidate user-provided content item links to a low-quality webpage and (2) rank or order the candidate user-provided content items based on these likelihoods. In some examples, the systems described herein may rank candidate user-provided content items based solely on the likelihoods that each of the candidate user-provided content items links to a low-quality webpage.

Alternatively, the systems described herein may rank candidate user-provided content items based on many additional factors. In one example, the systems described herein may use an additional model to determine an initial ranking (e.g., an initial ordering) for each of the user-provided content items that are candidates for a content feed of a user based on the user's connections, interests, demographics, etc. Using FIG. 11 as an example, applying module 1004 may, as part of online system 102 in FIG. 1, use model 1102 to generate an initial ranking 1104 of content items 124(1)-(3). In this example, ranking 1104 may indicate an initial order in which content items 124(1)-(3) should be displayed in content feed 128 (e.g., content item 124(1) first, content item 124(2) second, and content item 124(3) third). Upon determining an initial ranking for each of the user-provided content items, the systems described herein may adjust the ranking of each of the user-provided content items based on the likelihoods that the user-provided content items link to low-quality webpages. For example, the systems described herein may demote the rankings of user-provided content items with higher likelihoods of containing links to low-quality webpages and/or may promote the rankings of user-provided content items with lower likelihoods of containing links to low-quality webpages. Using FIG. 11 as an example, applying module 1004 may, as part of online system 102 in FIG. 1, demote the ranking of content item 124(1) based on a determination that a link of content item 124(1) has a relatively high likelihood of being to a low-quality webpage and/or promote the ranking of content item 124(3) based on a determination that a link of content item 124(3) has a relatively low likelihood of being to a low-quality webpage. In some examples, the systems described herein may eliminate a user-provided content item from being a candidate for a content feed if its likelihood of containing a link to a low-quality webpage is above a predetermined threshold.

At step 280, one or more of the systems described herein may display the user-provided content items in the content feed of the user based at least in part on the ranking. Using FIGS. 10 and 12 as an example, displaying module 1006 may, as part of online system 102 in FIG. 1 and/or client device 106(N) in FIG. 12, display content items 124(1)-(3) to a user within content feed 128. The systems described herein may use the ranking calculated at step 270 to display user-provided content items in a variety of ways. In general, the systems described herein may display user-provided content items such that user-provided content items with links that are less likely to be to low-quality webpages are displayed more often and user-provided content items with links that are more likely to be to low-quality webpages are displayed less often. In at least one example, the systems described herein may display user-provided content items such that links that are less likely to be to low-quality webpages are clicked on more often and links that are more likely to be to low-quality webpages are clicked less often. For example, the systems described herein may warn users of user-provided content items that contain links that are more likely to be to low-quality webpages.

As described above, the systems described herein may (1) build a link graph using information about known low-quality webpages (e.g., known ad-farm webpages) and their inbound and outbound links and then (2) train a prediction model using various features derived from the link graph. In some examples, a suitable pagerank, trustrank, anti-trustrank, or truncated pagerank algorithm may be applied to the link graph to generate the features used to train the prediction model. By using the prediction model to detect when user-provided content on an online system contains links that are likely to low-quality webpages, the systems and methods disclosed herein may display the user-provided content less prominently on the online system or not at all. By displaying the user-provided content less prominently or not at all, the systems and methods disclosed herein may display, more prominently or more often, other user-provided content that contain links that are likely to higher-quality webpages and thereby improve the viewing experiences of the users of the online system.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally means any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally means any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive user-provided links that have been sampled from an online system, transform the user-provided links into (1) one or more labels indicating whether one or more human labelers consider landing pages of the user-provided links to be low-quality webpages and (2) graph-based features of each of the user-provided links, output a result of the transformation to a training system that uses the label and the graph-based features of each of the user-provided links to train a model configured to predict a likelihood that a user-provided link is to a low-quality webpage, use the label and the graph-based features of each of the user-provided links to train the model, and store the model so that it may be applied to the links of additional user-provided content items in order to determine a ranking of the additional user-provided content items that may be used to determine if or how the additional user-provided content items should be displayed to users of the online system. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally means any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   receiving, by a content-feed system, user-provided content items from users of the content-feed system for presentation to other users of the content-feed system;
   sampling, by the content-feed system, user-provided links from the user-provided content items;
   receiving, by the content-feed system from at least one human labeler for each of the user-provided links, at least one label indicating whether the human labeler considers a landing page of the user-provided link to be a low-quality webpage;
   generating, by the content-feed system, a link graph from a crawl of the user-provided links, wherein the landing page of each of the user-provided links is represented in the link graph by a vertex;
   using, by the content-feed system, the link graph to derive at least one graph-based feature for each of the user-provided links;
   using, by the content-feed system, the label and the graph-based feature of each of the user-provided links to train a model to predict likelihoods that user-provided links area to low-quality webpages;
   receiving, by the content-feed system, additional user-provided content items that are candidates for presentation via a content feed of an additional user of the content-feed system;
   applying, by the content-feed system, the model to a link of each of the additional user-provided content items to determine a likelihood that a link of the additional user-provided content item is to a low-quality webpage; and
   displaying, by the content-feed system, the content feed to the additional user by:
      presenting, to the additional user, at least one of the additional user-provided content items whose likelihood is below a predetermined threshold; and
      refraining from presenting, to the additional user, at least one of the additional user-provided content items whose likelihood is above the predetermined threshold.

2. The computer-implemented method of claim 1, wherein:
   using the link graph to derive the graph-based feature for each of the user-provided links comprises applying, by the content-feed system, a pagerank algorithm to the link graph to derive a pagerank metric for each vertex in the link graph; and
   the graph-based feature of each of the user-provided links is the pagerank metric of the vertex in the link graph representing the landing page of the user-provided link.

3. The computer-implemented method of claim 1, wherein:
   using the link graph to derive the graph-based feature for each of the user-provided links comprises applying, by the content-feed system, a truncated-pagerank algorithm to the link graph to derive a truncated-pagerank metric for each vertex in the link graph; and
   the graph-based feature of each of the user-provided links is the truncated-pagerank metric of the vertex in the link graph representing the landing page of the user-provided link.

4. The computer-implemented method of claim 1, wherein:
   using the link graph to derive the graph-based feature for each of the user-provided links comprises:
      designating, as a trusted vertex, each vertex in the link graph representing a landing page having a label indicating that the human labeler does not consider the landing page to be a low-quality webpage; and
      applying, by the content-feed system, a trustrank algorithm to the link graph to derive a trustrank metric for each vertex in the link graph; and
   the graph-based feature of each of the user-provided links is the trustrank metric of the vertex in the link graph representing the user-provided link.

5. The computer-implemented method of claim 1, wherein:
   using the link graph to derive the graph-based feature for each of the user-provided links comprises:
      identifying an additional model configured to predict a likelihood that a webpage will be assigned a label indicating that the human labeler does not consider the landing page to be a low-quality webpage;
      using the additional model to predict, for each webpage represented in the link graph, a likelihood that the webpage would be assigned the label by the human labeler;
      designating, as a trusted vertex, each vertex in the link graph representing a webpage whose likelihood of being assigned the label by the human labeler is greater than a predetermined threshold; and applying, by the content-feed system, a trustrank algorithm to the link graph to derive a trustrank metric for each vertex in the link graph; and the graph-based feature of each of the user-provided links is the trustrank metric of the vertex in the link graph representing the user-provided link.

6. The computer-implemented method of claim 1, wherein:

using the link graph to derive the graph-based feature for each of the user-provided links comprises:

designating, as an untrusted vertex, each vertex in the link graph representing a landing page having a label indicating that the human labeler considers the landing page to be a low-quality webpage; and applying, by the content-feed system, an anti-trust-rank algorithm to the link graph to derive an anti-trust-rank metric for each vertex in the link graph; and the graph-based feature of each of the user-provided links is the anti-trust-rank metric of the vertex in the link graph representing the user-provided link.

7. The computer-implemented method of claim 1, wherein:

using the link graph to derive the graph-based feature for each of the user-provided links comprises:

identifying an additional model configured to predict a likelihood that a webpage will be assigned a label indicating that the human labeler considers the landing page to be a low-quality webpage;

using the additional model to predict, for each webpage represented in the link graph, a likelihood that the webpage would be assigned the label by the human labeler;

designating, as an untrusted vertex, each vertex in the link graph representing a webpage whose likelihood of being assigned the label by the human labeler is greater than a predetermined threshold; and applying, by the content-feed system, an anti-trust-rank algorithm to the link graph to derive an anti-trust-rank metric for each vertex in the link graph; and the graph-based feature of each of the user-provided links is the anti-trust-rank metric of the vertex in the link graph representing the user-provided link.

8. The computer-implemented method of claim 1, wherein displaying the content feed to the additional user comprises:

using an additional model to determine a ranking for each of the additional user-provided content items;

using the model to predict, for a link of at least one of the additional user-provided content items, a relatively higher likelihood of being a link to a low-quality webpage; and demoting the ranking of at least one of the additional user-provided content items based on the relatively higher likelihood.

9. The computer-implemented method of claim 1, wherein the content-feed system is a social-media system.

10. The computer-implemented method of claim 1, wherein the label of each of the user-provided links indicates whether the human labeler considers the landing page of the user-provided link to have less than a threshold level of high-quality content.

11. The computer-implemented method of claim 1, wherein the label of each of the user-provided links indicates whether the human labeler considers the landing page of the user-provided link to have a disproportionate volume of advertisements relative to high-quality content.

12. The computer-implemented method of claim 1, wherein the label of each of the user-provided links indicates whether the human labeler considers the landing page of the user-provided link to have one or more of:

sexually-suggestive content;

shocking content;

malicious content;

deceptive content;

a pop-up advertisement; or an interstitial advertisement.

13. A content-feed system comprising:

an identifying module, stored in memory, that receives user-provided content items from users of the content-feed system for presentation to other users of the content-feed system;

a sampling module, stored in memory, that samples user-provided links from the user-provided content items;

a receiving module, stored in memory, that receives, from at least one human labeler for each of the user-provided links, at least one label indicating whether the human labeler considers a landing page of the user-provided link to be a low-quality webpage;

a generating module, stored in memory, that generates a link graph from a crawl of the user-provided links, wherein the landing page of each of the user-provided links is represented in the link graph by a vertex;

a deriving module, stored in memory, that uses the link graph to derive at least one graph-based feature for each of the user-provided links;

a training module, stored in memory, that uses the label and the graph-based features of each of the user-provided links to train a model to predict likelihoods that user-provided links area to low-quality webpages, wherein the identifying module further receives additional user-provided content items that are candidates for presentation via a content feed of an additional user of the content-feed system;

an applying module, stored in memory, that applies the model to a link of each of the additional user-provided content items to determine a likelihood that a link of the additional user-provided content item is to a low-quality webpage;

a displaying module, stored in memory, that displays the content feed to the additional user by:

presenting, to the additional user, at least one of the additional user-provided content items whose likelihood is below a predetermined threshold; and refraining from presenting, to the additional user, at least one of the additional user-provided content items whose likelihood is above the predetermined threshold; and at least one physical processor configured to execute the sampling module, the receiving module, the generating module, the deriving module, the training module, the identifying module, the applying module, and the displaying module.

14. The content-feed system of claim 13, wherein:

the deriving module uses the link graph to derive the graph-based feature for each of the user-provided links by applying a pagerank algorithm to the link graph to derive a pagerank metric for each vertex in the link graph; and the graph-based feature of each of the user-provided links is the pagerank metric of the vertex in the link graph representing the landing page of the user-provided link.

15. The content-feed system of claim 13, wherein:
the deriving module uses the link graph to derive the graph-based feature for each of the user-provided links by applying a truncated-pagerank algorithm to the link graph to derive a truncated-pagerank metric for each vertex in the link graph; and
the graph-based feature of each of the user-provided links is the truncated-pagerank metric of the vertex in the link graph representing the landing page of the user-provided link.

16. The content-feed system of claim 13, wherein:
the deriving module uses the link graph to derive the graph-based feature for each of the user-provided links by:
designating, as a trusted vertex, each vertex in the link graph representing a landing page having a label indicating that the human labeler does not consider the landing page to be a low-quality webpage; and
applying a trustrank algorithm to the link graph to derive a trustrank metric for each vertex in the link graph; and
the graph-based feature of each of the user-provided links is the trustrank metric of the vertex in the link graph representing the user-provided link.

17. The content-feed system of claim 13, wherein:
the deriving module uses the link graph to derive the graph-based feature for each of the user-provided links by:
identifying an additional model configured to predict a likelihood that a webpage will be assigned a label indicating that the human labeler does not consider the landing page to be a low-quality webpage;
using the additional model to predict, for each webpage represented in the link graph, a likelihood that the webpage would be assigned the label by the human labeler;
designating, as a trusted vertex, each vertex in the link graph representing a webpage whose likelihood of being assigned the label by the human labeler is greater than a predetermined threshold; and
applying a trustrank algorithm to the link graph to derive a trustrank metric for each vertex in the link graph; and
the graph-based feature of each of the user-provided links is the trustrank metric of the vertex in the link graph representing the user-provided link.

18. The content-feed system of claim 13, wherein:
the deriving module uses the link graph to derive the graph-based feature for each of the user-provided links by:
designating, as an untrusted vertex, each vertex in the link graph representing a landing page having a label indicating that the human labeler considers the landing page to be a low-quality webpage; and
applying an anti-trust-rank algorithm to the link graph to derive an anti-trust-rank metric for each vertex in the link graph; and
the graph-based feature of each of the user-provided links is the anti-trust-rank metric of the vertex in the link graph representing the user-provided link.

19. The content-feed system of claim 13, wherein:
the deriving module uses the link graph to derive the graph-based feature for each of the user-provided links by:
identifying an additional model configured to predict a likelihood that a webpage will be assigned a label indicating that the human labeler considers the landing page to be a low-quality webpage;
using the additional model to predict, for each webpage represented in the link graph, a likelihood that the webpage would be assigned the label by the human labeler;
designating, as an untrusted vertex, each vertex in the link graph representing a webpage whose likelihood of being assigned the label by the human labeler is greater than a predetermined threshold; and
applying an anti-trust-rank algorithm to the link graph to derive an anti-trust-rank metric for each vertex in the link graph; and
the graph-based feature of each of the user-provided links is the anti-trust-rank metric of the vertex in the link graph representing the user-provided link.

20. A computer-readable medium comprising computer-readable instructions that, when executed by at least one processor of at least one computing device of a content-feed system, cause the computing device to:
receive user-provided content items from users of the content-feed system for presentation to other users of the content-feed system;
sample user-provided links from the user-provided content items;
receive, from at least one human labeler for each of the user-provided links, at least one label indicating whether the human labeler considers a landing page of the user-provided link to be a low-quality webpage;
generate a link graph from a crawl of the user-provided links, wherein the landing page of each of the user-provided links is represented in the link graph by a vertex;
use the link graph to derive at least one graph-based feature for each of the user-provided links;
use the label and the graph-based feature of each of the user-provided links to train a model to predict likelihoods that user-provided links are to low-quality webpages;
receive additional user-provided content items that are candidates for presentation via a content feed of an additional user of the content-feed system;
apply the model to a link of each of the additional user-provided content items to determine a likelihood that a link of the additional user-provided content item is to a low-quality webpage; and
display the content feed to the user by:
presenting, to the additional user, at least one of the additional user-provided content items whose likelihood is below a predetermined threshold; and
refraining from presenting, to the additional user, at least one of the additional user-provided content items whose likelihood is above the predetermined threshold.

* * * * *

UNITED STATES PATENT AND TRADEMARK OFFICE
CERTIFICATE OF CORRECTION

PATENT NO. : 10,706,114 B2  
APPLICATION NO. : 15/816121  
DATED : July 7, 2020  
INVENTOR(S) : Sijian Tang et al.

Page 1 of 1

It is certified that error appears in the above-identified patent and that said Letters Patent is hereby corrected as shown below:

In the Claims

In Column 18, Line 38, Claim 13, delete "area" and insert -- are --, therefor.

Signed and Sealed this  
Twenty-fifth Day of August, 2020

Andrei Iancu  
*Director of the United States Patent and Trademark Office*